US012596477B2

(12) United States Patent
Virani et al.

(10) Patent No.: US 12,596,477 B2
(45) Date of Patent: *Apr. 7, 2026

(54) MEMORY DEVICE LOG DATA STORAGE

(71) Applicant: Micron Technology, Inc., Boise, ID (US)

(72) Inventors: Scheheresade Virani, Frisco, TX (US); Jeffrey Lee Munsil, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,399

(22) Filed: Jun. 27, 2024

(65) Prior Publication Data

US 2024/0345730 A1 Oct. 17, 2024

Related U.S. Application Data

(63) Continuation of application No. 17/822,250, filed on Aug. 25, 2022, now Pat. No. 12,039,163.

(51) Int. Cl.
G06F 3/06 (2006.01)

(52) U.S. Cl.
CPC .......... G06F 3/0608 (2013.01); G06F 3/0629 (2013.01); G06F 3/0679 (2013.01)

(58) Field of Classification Search
CPC ....... G06F 3/0656; G06F 3/0679; G06F 3/061
See application file for complete search history.

(56) References Cited

U.S. PATENT DOCUMENTS

| | | | | |
|---|---|---|---|---|
| 10,628,280 | B1 * | 4/2020 | Reeves .............. | G06F 11/3017 |
| 11,593,248 | B2 * | 2/2023 | Moiseyenko ......... | G06F 3/0604 |
| 12,039,163 | B2 * | 7/2024 | Virani .................... | G06F 3/061 |
| 2019/0384666 | A1 * | 12/2019 | Puthillathe ............... | G06T 1/20 |
| 2024/0069726 | A1 | 2/2024 | Virani et al. | |

* cited by examiner

*Primary Examiner* — Edward J Dudek, Jr.
(74) *Attorney, Agent, or Firm* — Harrity & Harrity, LLP

(57) ABSTRACT

Implementations described herein relate to memory device log data storage. In some implementations, a memory device may store a first data stream associated with a first type of log data in a circular buffer. The memory device may store a second data stream associated with a second type of log data in another memory location. The memory device may detect an event included in the second data stream that is associated with an attribute level that satisfies a threshold. The memory device may write data stored in the circular buffer after a time at which the event is detected to a non-volatile memory based on the attribute level satisfying the threshold, wherein the data stored in the circular buffer is stored in the non-volatile memory in connection with data associated with the event.

20 Claims, 9 Drawing Sheets

400

120

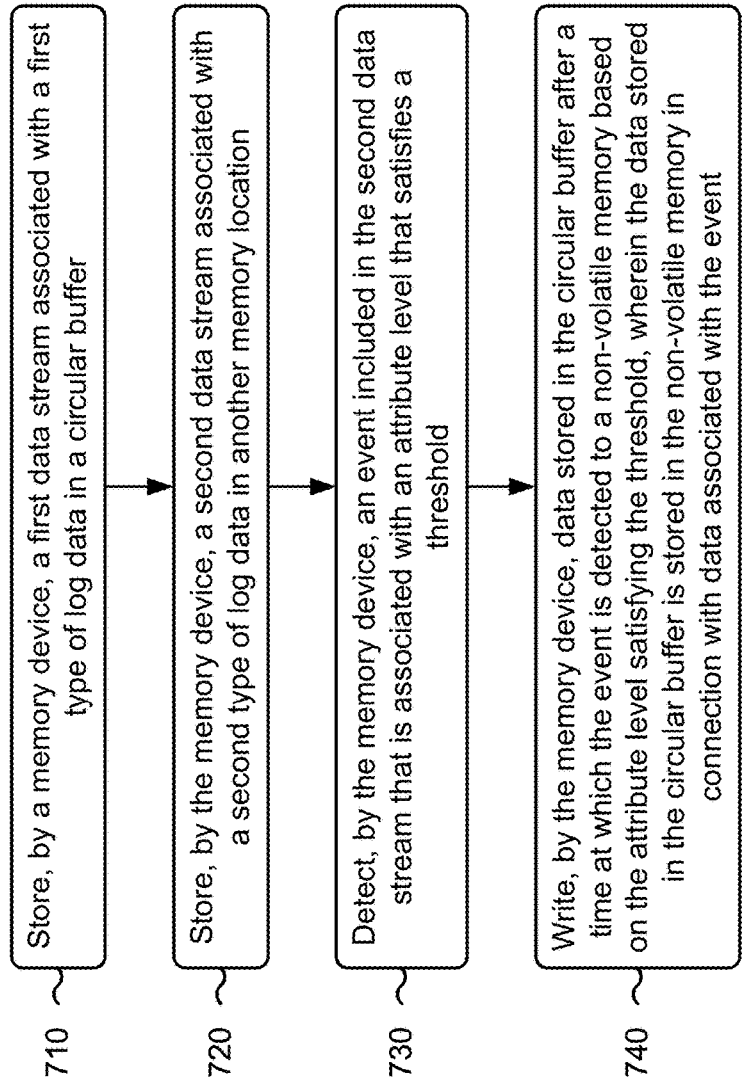

710 Store, by a memory device, a first data stream associated with a first type of log data in a circular buffer 720 Store, by the memory device, a second data stream associated with a second type of log data in another memory location 730 Detect, by the memory device, an event included in the second data stream that is associated with an attribute level that satisfies a threshold 740 Write, by the memory device, data stored in the circular buffer after a time at which the event is detected to a non-volatile memory based on the attribute level satisfying the threshold, wherein the data stored in the circular buffer is stored in the non-volatile memory in connection with data associated with the event

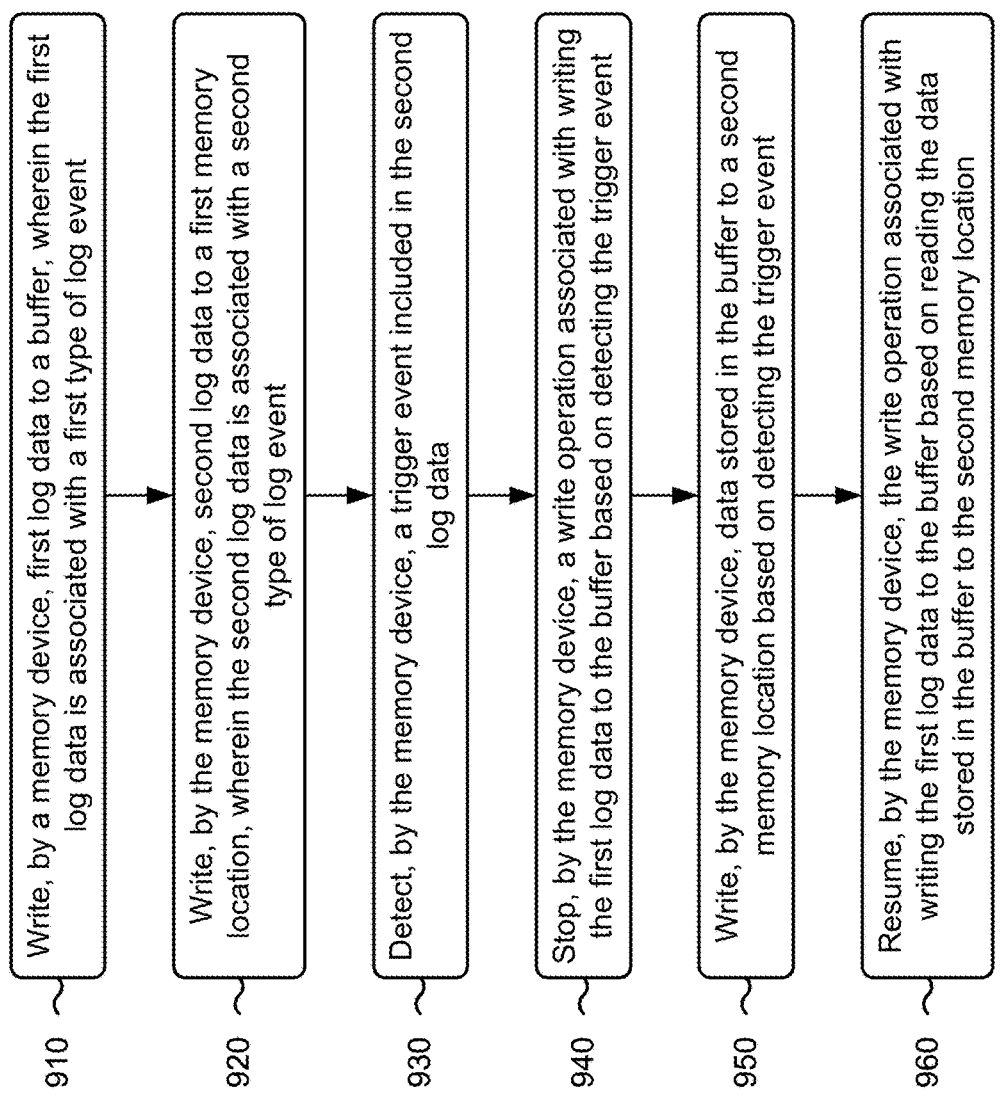

910 Write, by a memory device, first log data to a buffer, wherein the first log data is associated with a first type of log event 920 Write, by the memory device, second log data to a first memory location, wherein the second log data is associated with a second type of log event 930 Detect, by the memory device, a trigger event included in the second log data 940 Stop, by the memory device, a write operation associated with writing the first log data to the buffer based on detecting the trigger event 950 Write, by the memory device, data stored in the buffer to a second memory location based on detecting the trigger event 960 Resume, by the memory device, the write operation associated with writing the first log data to the buffer based on reading the data stored in the buffer to the second memory location

MEMORY DEVICE LOG DATA STORAGE

RELATED APPLICATION

This application is a continuation of U.S. patent application Ser. No. 17/822,250, filed Aug. 25, 2022, which is incorporated herein by reference in its entirety.

TECHNICAL FIELD

The present disclosure generally relates to memory devices, memory device operations, and, for example, to memory device log data storage.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIG. 7 is a flowchart of an example method associated with memory device log data storage.

FIG. 9 is a flowchart of an example method associated with memory device log data storage.

DETAILED DESCRIPTION

Figure 1:
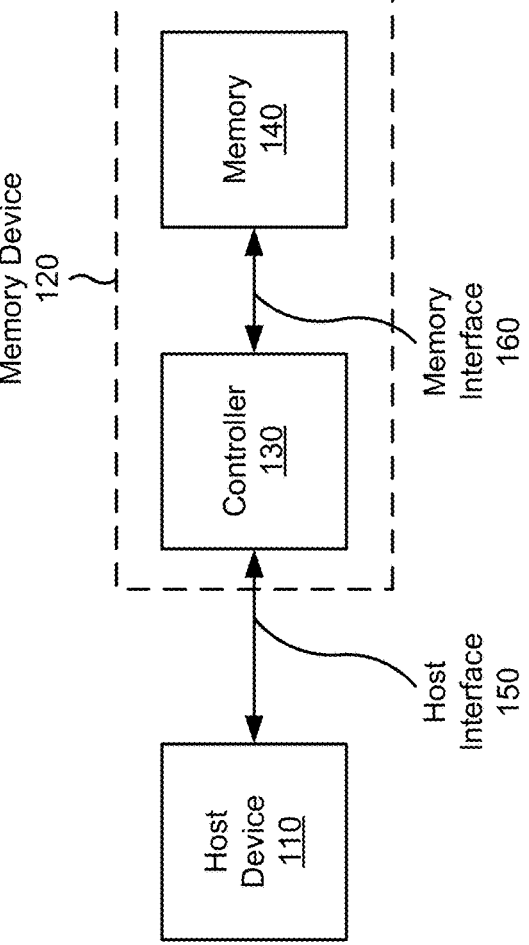
FIG. 1 is a diagram illustrating an example system capable of performing operations associated with memory device log data storage.

In some cases, a memory device may generate, classify, and/or store log data. The log data may be associated with various events associated with the memory device. For example, event log messages may include informational and/or debugging messages. In some examples, event log messages may include warning and/or error messages. Additionally, or alternatively, event log messages may include information about non-volatile memory on memory devices. Examples include NAND-related usage statistics. Critical, or severe, log messages may include less frequent events that are more critical in nature. Examples of critical events may include NAND block retirement and a drive case temperature reaching a critical threshold.

For example, the memory device may monitor operations and/or components associated with the memory device to identify events associated with the operation of the memory device. The events are tracked and logged in an event log storing information associated with each event (herein "event information" or "event log messages"). An event log entry corresponding to an event may include multiple data fields of event data. Example data fields can include an event number, an event identifier, a power cycle count, a time-stamp, an event type, a data byte length (Dlen), a tempera-ture of the memory sub-system corresponding to an event, and/or a firmware version identifier (FWVer), among other examples. In some examples, an event description can be derived from the event identifier, where a mapping (e.g., a table) identifies each event identifier and a corresponding event description.

Event logs may be subject to a wrapping process, where older log entries are replaced by newer entries in a first-in-first-out (FIFO) order in response to exceeding a reserved capacity threshold of a corresponding storage medium (e.g., negative-or (NOR) or negative-and (NAND) medium). A finite number of event log entries can be stored prior to execution of the wrapping process. In an example, an event log can wrap multiple times, causing the deletion or replace-ment of multiple log entries. This may result in the loss of important event information in older log entries due to limitations in storage space availability. Deleted or dis-carded log entries can include event information that is important to a memory device designer in gaining a better understanding of the memory device's performance history for debugging purposes or design improvements. As an example, the memory device may preserve a first set of event logs (e.g., in a non-volatile memory of the memory device, such as NAND memory) and may not store a second set of event logs on the memory device. For example, the memory device may transfer the second set of event logs to be stored in a different memory (e.g., an "off-chip" memory, such as via a Nexus interface). The memory device may classify event logs as "persistent" or "non-persistent." Per-sistent event logs may be event logs that are stored on a memory of the memory device (e.g., in NAND memory or another non-volatile memory of the memory device). For example, persistent event logs may be event logs that are typically stored in a persistent storage location. Non-persis-tent event logs may be event logs that are stored in a separate memory that is not included in the memory device (e.g., an off-chip memory). For example, non-persistent event logs may be event logs that are typically stored in a non-persistent storage location. In some examples, persistent event logs may include the critical, or severe, log messages that may occur less frequently and that are more critical in nature. The non-persistent event logs may include control flow information (e.g., steps performed as part of an opera-tion), contextual information, or other detailed information associated with operations performed by the memory device. The non-persistent event logs may provide valuable information for debugging or design purposes. However, because the non-persistent event logs may be associated with a larger size and because of finite memory resources available to store the event logs, such event logs may not be stored on the memory device. Therefore, this may result in a loss of this information being available for debugging and/or design purposes.

Some implementations described herein enable improved memory device log data storage. For example, the memory device may be configured to store non-persistent event logs in a buffer having a fixed size, such as a circular buffer. When the circular buffer is full, the memory device may be configured to remove and/or overwrite the oldest data stored in the buffer with new data. The buffer may be associated with volatile memory, such as static random access memory (RAM) (SRAM), or dynamic RAM (DRAM), among other examples. The memory device may be configured to transfer and/or store data in the buffer (e.g., the circular buffer) based on an event (e.g., associated with persistent event log data) occurring that has a given attribute. For example, the attri-bute may be a severity level of the event. Based on detecting the event (e.g., which may be referred to herein as a "trigger event"), the memory device may be configured to read data from the buffer and write the data to a non-volatile memory of the memory device, such as NAND memory. For example, the memory device may be configured to store information associated with the event (e.g., the trigger event) and information stored in the buffer together (e.g., associated with one another) in the non-volatile memory of the memory device.

In some implementations, based on detecting the event (e.g., the trigger event), the memory device may be config-ured to stop a write operation associated with the buffer (e.g., the circular buffer). This may maintain a coherency of data that is flushed from the buffer to the non-volatile memory (e.g., ensuring that, before the buffer is flushed, additional data that may not be relevant to the trigger event is not added to the buffer and/or that relevant data is not overwritten in the buffer by additional irrelevant data). In some implementations, based on flushing the buffer to the non-volatile memory (or a temporary or transitional memory location), the memory device may be configured to resume the write operation to the buffer.

As a result, event log information associated with normal or typical memory device operation (e.g., control flow information, device status information, or other information) may be stored in connection with event log information associated with severe or critical events (e.g., error events or exception events). For example, because the buffer (e.g., the circular buffer) stores the most recent event log information associated with normal or typical memory device operation, causing the buffer to be flushed to the non-volatile memory when a trigger event is detected may provide a "snapshot" of more detailed event log information associated with the memory device around the time when the trigger event occurred. Additionally, because the buffer may have a fixed size, this may enable the memory device to conserve a size associated with storing the non-persistent event log infor-mation (e.g., as compared to storing all non-persistent event log information that is generated by the memory device) while also enabling more detailed event log information to be stored when severe or critical events occur. This may be beneficial for debugging or design operations that would not otherwise have the more detailed event log information (e.g., the non-persistent event log information) that is asso-ciated with a trigger event available.

FIG. 1 is a diagram illustrating an example system 100 capable of performing operations associated with memory device log data storage. The system 100 may include one or more devices, apparatuses, and/or components for perform-ing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless com-munication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to store non-persistent event logs in a buffer having a fixed size, such as a circular buffer. When the circular buffer is full, the memory device 120 and/or the controller 130 may be configured to remove and/or overwrite the oldest data stored in the buffer with new data. The buffer may be associated with volatile memory, such as SRAM, or DRAM, among other examples. The memory device 120 and/or the controller 130 may be configured to transfer and/or store data in the buffer (e.g., the circular buffer) based on an event (e.g., associated with persistent event log data) occurring that has a given attribute. For example, the attribute may be a severity level of the event. Based on detecting the event, the memory device 120 and/or the controller 130 may be configured to read data from the buffer and write the data to a non-volatile memory of the memory device, such as NAND memory. For example, the memory device 120 and/or the controller 130 may be configured to store information associated with the event (e.g., the trigger event) and information stored in the buffer together (e.g., associated with one another) in the non-volatile memory of the memory device 120.

As indicated above, FIG. 1 is provided as an example. Other examples may differ from what is described with regard to FIG. 1.

Figure 2:
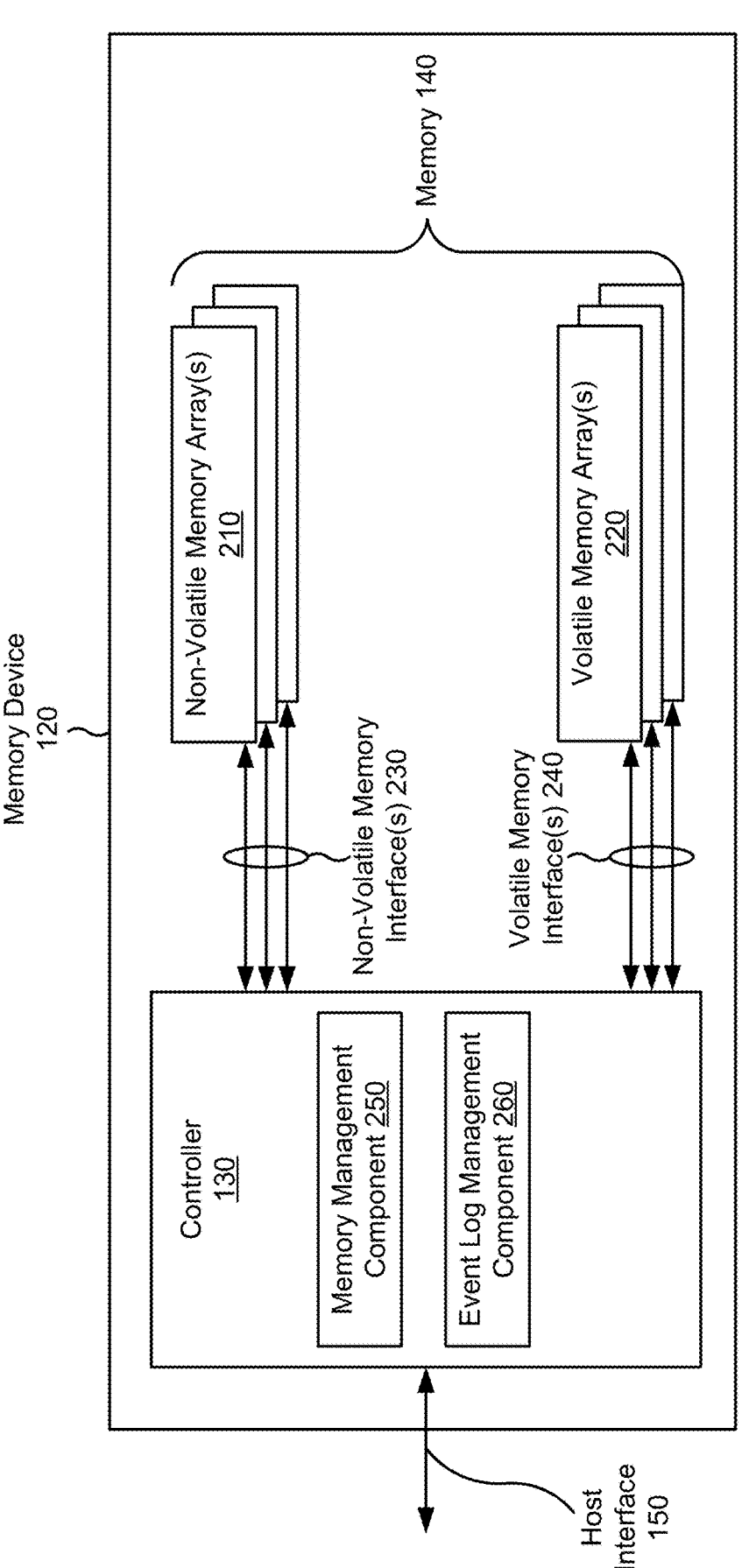
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, and/or an event log management component 260, among other examples. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The event log management component 260 may be configured to store and/or write event log data to one or more memories of the memory device 120. For example, the event log management component 260 may be configured to obtain a data stream that includes event log data. The event log management component 260 may be configured to categorize or sort the event log data into a first type of event log data (e.g., non-persistent event logs) and a second type of event log data (e.g., persistent event logs). The event log management component 260 may be configured to store or write the first type of event log data to a first memory (e.g., a buffer, such as a circular buffer). The event log management component 260 may be configured to store or write the second type of event log data to a second memory. In some implementations, the event log management component 260 may be configured to flush the buffer (e.g., the circular buffer) to non-volatile memory (e.g., NAND memory) based on detecting that an event associated with the second type of event log data has a given attribute (e.g., a given severity level), as described in more detail elsewhere herein.

Figure 5:
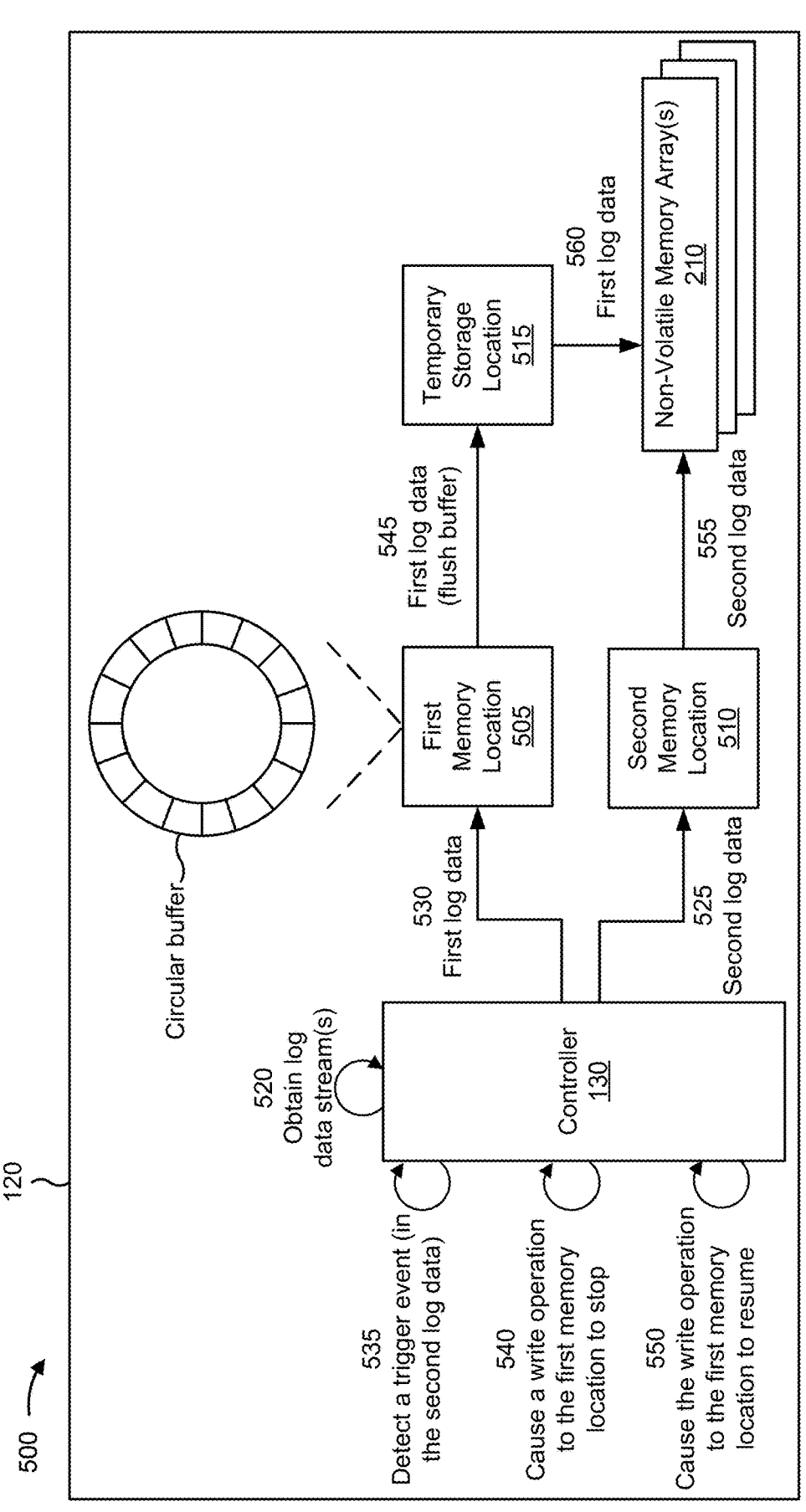
FIG. 5 is a diagram illustrating an example associated with memory device log data storage.
Figure 6:
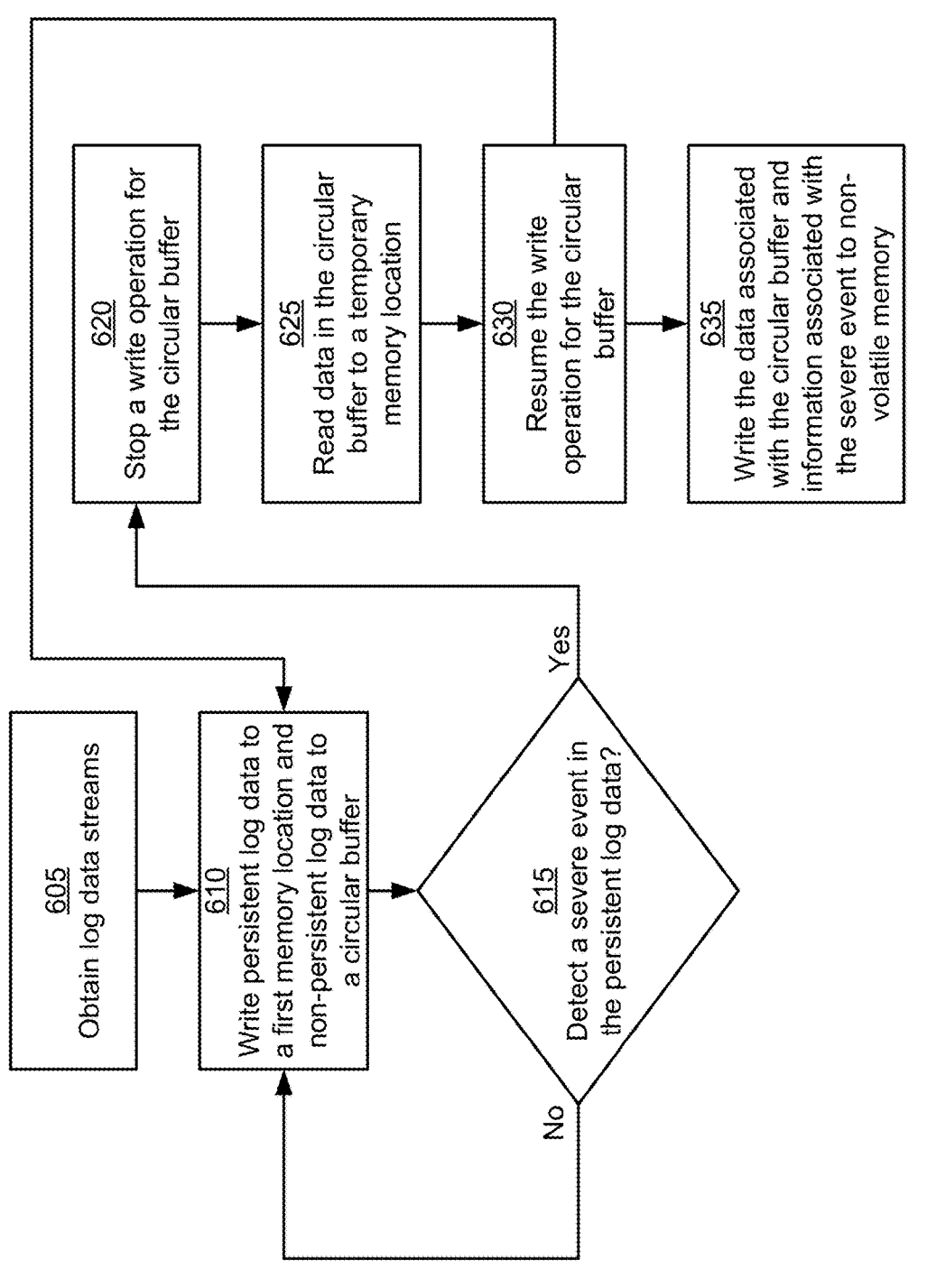
FIG. 6 is a diagram illustrating an example of a process associated with memory device log data storage.
Figure 8:
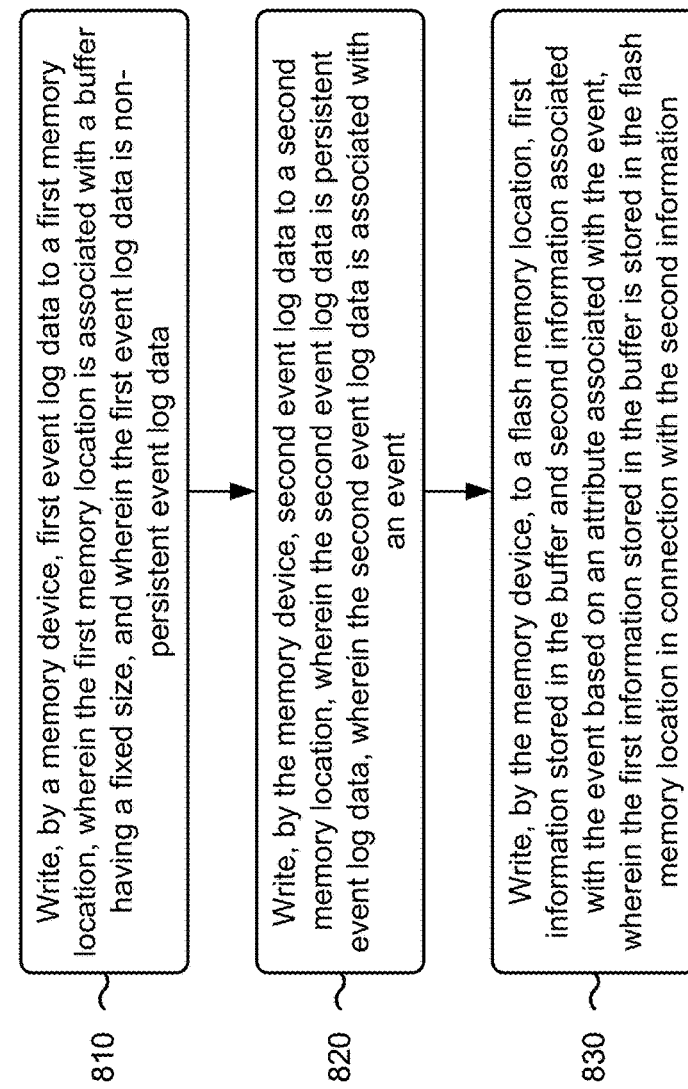
FIG. 8 is a flowchart of an example method associated with memory device log data storage.

One or more devices or components shown in FIG. 2 may be configured to perform operations described elsewhere herein, such as one or more operations of FIGS. 5 and 6 and/or one or more process blocks of the methods of FIGS. 7-9. For example, the controller 130 and/or the event log management component 260 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
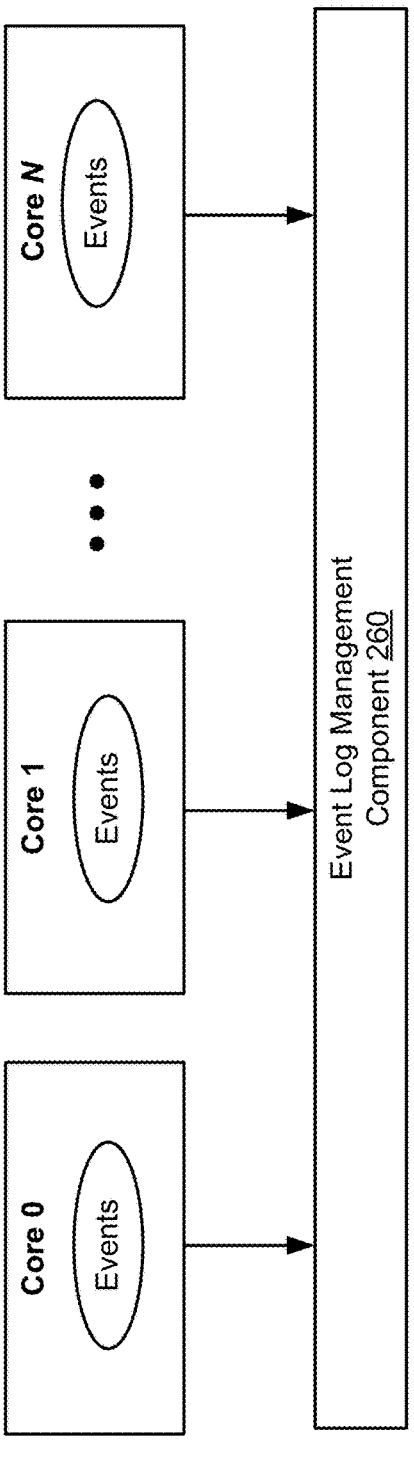
FIG. 3 is a diagram illustrating an example of event logging for events associated with a memory device.

FIG. 3 is a diagram illustrating an example 300 of event logging for events associated with a memory device. An event logging system, such as the example 300, may be used to collect, store, and/or transmit event logs for debugging and logging purposes.

For example, the event log management component 260 can implement an event logging system in a system (e.g., a memory device 120) with multiple cores. For example, the event log management component 260 may be a distributed event logging system with one or more event log manager subcomponents in each of the multiple cores. The event log management component 260 may implement an event logging system by generating compact log entries within local logs of individual cores of a multiple core system, aggregating the log entries from the multiple cores into single staging logs, and/or storing the log entries in a memory location based on log message type or category, among other examples.

As shown in FIG. 3, a memory device 120 may be associated with N cores (sometimes referred to as blocks). In some examples, a core may correspond to a processor. Each core may include a local log manager (e.g., shown as the event messenger in FIG. 3) and a set of local log structures. In one example, each core may store a local log in a DRAM buffer (e.g., with a size of 8 KB or 16 KB) for storing event log data. Each event messenger may manage the storage of event log entries in the appropriate log structure related to events in the corresponding core. Each event messenger may monitor for the occurrence of one or more log flush trigger events, and can initiate a local log flush (e.g., by sending a request to a staging log manager or by flushing log entries to the appropriate staging log). In some examples, the event messenger may determine a placement of log entries in the appropriate log structure in response to the content of a macro call requesting the log entry.

For example, a given event messenger may consolidate multiple source data and output a stream of logs. The event messenger may provide an input to the event log management component 260 (e.g., the input being event log data collected by the event messenger). The event log management component 260 may be configured to consolidate all input logs and output a single stream of log data to one or more memory locations. For example, the event log management component 260 may be associated with one or multiple channels of operation (e.g., one or multiple memory locations). As an example, the event log management component 260 may be associated with a first channel (e.g., a first memory location) associated with persistent log events and a second channel (e.g., a second memory location) associated with non-persistent log events. The one or more memory locations may be used to store event log data. In some examples, a memory location may be read out to a memory array of the memory device 120 (e.g., memory 140), such as for persistent log events. Additionally, or alternatively, a memory location may be read out to a memory location that is separate from the memory device 120 (e.g., an off-chip memory).

In some examples, a log entry may include a log entry header, an optional absolute time field, and one or more data parameters. The log entry header may include a message identifier, a timestamp absolute flag, a timestamp, and a number of data parameters (e.g., double words (DWORDS)). For example, the message identifier may be 16 bits, the timestamp may be 12 bits, the timestamp absolute flag may be 1 bit, and the number of data parameters may be 3 bits. Other formats of the log entry are possible. In some examples, the event log management component 260 may include additional metadata in the message identifier. For example, the metadata can include a core identifier and a log level for the log entry (e.g., a severity level or a classification of the log entry).

As indicated above, FIG. 3 is provided as an example. Other examples may differ from what is described with regard to FIG. 3.

Figure 4:
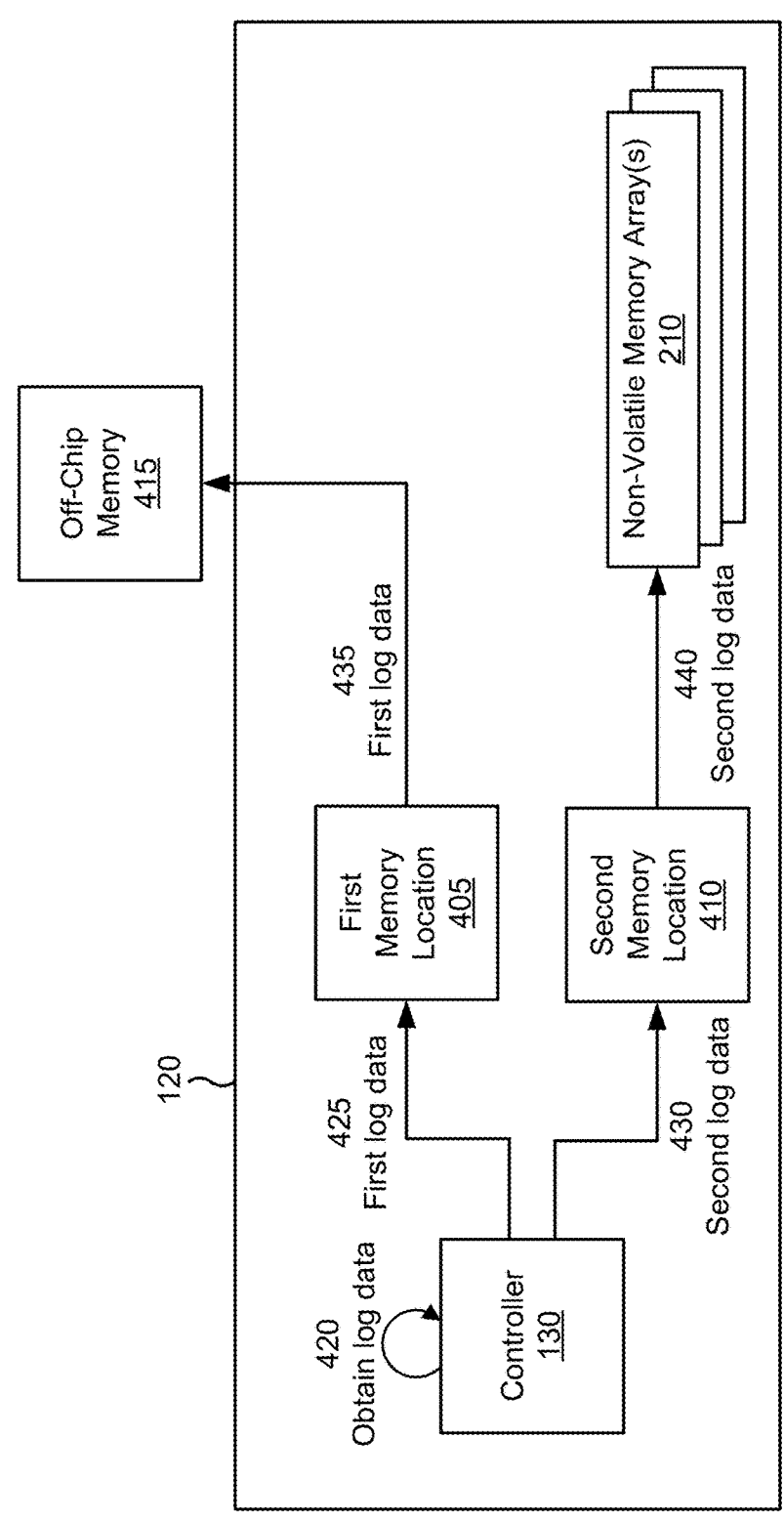
FIG. 4 is a diagram illustrating an example of event logging associated with a memory device.

FIG. 4 is a diagram illustrating an example 400 of event logging associated with a memory device. As described elsewhere herein, the controller 130 of the memory device 120 may be configured to store event logs corresponding to different events that occur on the controller 130 over time. In other words, the event logging performed by the controller 130 may be a time-based event logging to provide indications of event log data of events that occur over time. However, the memory device 120 may have limited or finite memory resources available to store the event log data. Therefore, the controller 130 may classify and/or categorize event logs to determine when, where, and/or whether to store the event logs (e.g., to ensure that log events containing more important or more noteworthy information are stored in memory (e.g., the memory 140) of the memory device 120).

For example, as shown in FIG. 4, the memory device may be associated with a first memory location 405 and a second memory location 410. The first memory location 405 and the second memory location 410 may be staging locations or temporary storage locations for event log data. In some examples, the first memory location 405 and the second memory location 410 may be a volatile memory location, such as SRAM location or a DRAM location. The first memory location 405 and the second memory location 410 may be referred to as channels or memory channels (e.g., a first channel and a second channel). The first memory location 405 may be used by the memory device 120 to store a first type of event log data, and the second memory location 410 may be used by the memory device 120 to store a second type of event log data. In some examples, the memory device 120 may be associated with an off-chip (or off-device) memory 415. The off-chip memory 415 may be a memory location (e.g., a physical memory location, such as a disk drive) that is separate from the memory device 120.

As shown by reference number 420, the controller 130 (e.g., the event log management component 260) may obtain log data. For example, the event log management component 260 may obtain a data stream of event log data (e.g., from different cores or processors associated with the memory device 120, as explained elsewhere herein such as in connection with FIG. 3). The controller 130 may categorize or sort event log messages into different types or categories (e.g., based on information indicated by the event log messages).

For example, an event log message may be associated with a first type of event log or a second type of event log. The first type of event log may be non-persistent event logs. For example, the first type of event log may be associated with control flow information (e.g., indicating steps performed as part of one or more operations), memory device status, and/or other event log data associated with normal operation of the memory device 120. The second type of event log may be persistent event logs. For example, the second type of event log may be associated with error events, exception events, and/or other event log data associated with unusual or uncommon operation of the memory device 120. As used herein "non-persistent" event logs may refer to event log data that is not persistently, or permanently, stored on the memory device 120 (e.g., in the memory 140). Similarly, "persistent" event logs may refer to event log data that is persistently, or permanently, stored on the memory device 120 (e.g., in the memory 140).

As shown by reference number 425, the controller 130 (e.g., the event log management component 260) may be configured to cause first log data (e.g., associated with the first type of event log) to be stored in the first memory location 405. Similarly, as shown by reference number 430, the controller 130 (e.g., the event log management component 260) may be configured to cause second log data (e.g., associated with the second type of event log) to be stored in the second memory location 410. In some examples, the event log data may be stored in the second memory location 410 in log units (e.g., having a given size). When a given event log is added to the second memory location 410, if a size of the event log fills a partial log unit, then padding (e.g., zero padding) may be used to fill a remainder of the log unit. In this way, coherent log units may be maintained for writing, reading, and/or wrapping log data stored in the second memory location 410. Therefore, when data is read from the second memory location 410, a coherent structure may be maintained for reading out the event log data (e.g., such that other components or modules of the memory device 120 are aware of a size of the log units to be read and/or written).

In some examples, as shown by reference number 435, the memory device 120 may be configured to store the first log data in the off-chip memory 415. For example, the memory device 120 may include an interface (e.g., a Nexus interface or another interface) with a memory location that is not included in the memory device 120. The memory device 120 may be configured to pass the first log data to the off-chip memory 415 via the interface. In other words, the memory device 120 may be configured to flush the first memory location 405 to the off-chip memory 415. This may conserve memory resources that would have otherwise been used to store event log data that is associated with typical or normal operation of the memory device 120.

As shown by reference number 440, the memory device 120 may be configured to store the second log data in the non-volatile memory array(s) 210 of the memory device 120. For example, the memory device 120 may be configured to store the second log data in NAND memory. In other words, the controller 130 may be configured to flush the second memory location 410 to the non-volatile memory array(s) 210 of the memory device 120 to store the second log data on the memory device 120. This may enable event logs indicating information associated with important, unusual, or atypical operations (e.g., error cases or exception cases) associated with the memory device 120 to be stored on the memory device 120.

As a result, in a debugging operation, the event logs indicating information associated with important, unusual, or atypical operations (e.g., error cases or exception cases) associated with the memory device 120 may be available to be read, reviewed, and/or analyzed. However, during debugging operations, the interface with the off-chip memory 415 may not be functional or available. In some cases, the first log data provide beneficial contextual information regarding operation of the memory device 120 around a time that an error or exception occurred (e.g., as indicated by an event included in the second log data). However, the first log data may not be available for the debugging operation due to the categorization and separated storage techniques used to store the log data (e.g., used by the memory device 120 to handle memory resource constraints).

As indicated above, FIG. 4 is provided as an example. Other examples may differ from what is described with regard to FIG. 4.

FIG. 5 is a diagram illustrating an example 500 associated with memory device log data storage. As shown in FIG. 5, the memory device 120 may be configured to store the first type of event log data (e.g., event log data associated with normal or typical operation of the memory device 120, such as non-persistent event log data) in a buffer (e.g., a circular buffer). This may enable the memory device 120 to write data stored in the buffer to the non-volatile memory array(s) 210 when an event having a certain attribute is detected. The non-volatile memory array(s) 210 may be referred to herein as flash memory (e.g., a flash memory location). For example, information associated with the event may be stored in connection with the data stored in the buffer to provide additional information or context of operations of the memory device 120 at a time proximate to when the event occurred, as described in more detail elsewhere herein. This may enable a size of the data stored for event logging to comply with memory resource constraints while also enabling additional contextual information associated with operations of the memory device 120 to be stored when certain events (e.g., severe or critical events) occur.

For example, as shown in FIG. 5, the memory device 120 may be associated with a first memory location 505 and a second memory location 510. The first memory location 505 and the second memory location 510 may be staging locations or temporary storage locations for event log data. In some examples, the first memory location 505 and the second memory location 510 may be a volatile memory location, such as SRAM location or a DRAM location. In some examples, both the first memory location 505 and the second memory location 510 may be SRAM. In other examples, the first memory location 505 may be SRAM and the second memory location 510 may be another type of memory. The first memory location 505 and the second memory location 510 may be referred to as channels or memory channels (e.g., a first channel and a second channel). The first memory location 505 may be used by the memory device 120 to store a first type of event log data and the second memory location 510 may be used by the memory device 120 to store a second type of event log data (e.g., persistent event log data).

In some implementations, the first memory location 505 may be associated with a buffer having a fixed size. For example, as shown in FIG. 5, the first memory location 505 may be associated with a circular buffer. The circular buffer may also be referred to as a ring buffer, a circular queue, and/or a cyclic buffer, among other examples. For example, the first memory location 505 may include a data structure that uses a single, fixed-size buffer as if the data structure were connected end-to-end. For example, the circular buffer may include a fixed quantity of elements (e.g., memory units or log units). A property of the circular buffer is that when the circular buffer is full and a subsequent write is performed to the circular buffer, then the oldest data stored in the circular buffer may be overwritten. For example, the circular buffer may be associated with two pointers. A first pointer may point to a front of the data structure (e.g., where new data is to be written). A second pointer may point to a back of the data structure (e.g., to the oldest data in the circular buffer). In some examples, the first pointer may be a write pointer (e.g., pointing to where data is to be written to the circular buffer) and the second pointer may be a read pointer (e.g., pointing to where data is to be read from the circular buffer).

By storing two pointers that dynamically point to the front and back of the data structure respectively, there may be no need to dynamically manipulate the memory array (e.g., as new data is added to the circular buffer). For example, as more data is added to the circular buffer, the old data will be removed or overwritten (e.g., as indicated by one of the pointers) so no data will ever need to be shifted within the circular buffer. Rather, the pointers will shift positions to point to different units within the circular buffer. Because the circular buffer has a fixed size, memory resources may be conserved that would have otherwise been used to store all data that is pushed to the first memory location 505. Additionally, the functionality of the circular buffer may ensure that the most recent data is stored within the buffer, thereby improving a likelihood that data stored in the circular buffer is relevant for debugging or design purposes.

In some implementations, the memory device 120 may include a temporary storage location 515 associated with the first memory location 505. The temporary storage location 515 may be referred to as a transitional storage location or a staging storage location, among other examples. In some implementations, the temporary storage location 515 may be DRAM, SRAM, or another type of volatile memory.

As shown by reference number 520, the controller 130 (e.g., the event log management component 260) may obtain log data. For example, t the controller 130 may obtain a data stream of event log data (e.g., from different cores or processors associated with the memory device 120, as explained elsewhere herein such as in connection with FIG. 3). The controller 130 may categorize or sort event log messages into different types or categories (e.g., based on information indicated by the event log messages). In some implementations, the controller 130 may categorize or sort event log messages based on an indicator associated with a given event log message. For example, a header or another part of an event log message may indicate a category or type of event that is associated with the event log message.

For example, an event log message may be associated with a first type of event log or a second type of event log, in a similar manner as described elsewhere herein (such as in connection with FIG. 4). The first type of event log may be non-persistent event logs. For example, the first type of event log may be associated with control flow information (e.g., indicating steps performed as part of one or more operations), memory device status, and/or other event log data associated with normal operation of the memory device 120. The second type of event log may be persistent event logs. For example, the second type of event log may be associated with error events, exception events, and/or other event log data associated with unusual or uncommon operation of the memory device 120.

As shown by reference number 525, the controller 130 (e.g., the event log management component 260) may be configured to cause second log data (e.g., associated with the second type of event log) to be stored in the second memory location 510. For example, the controller 130 may be configured to write the second log data to the second memory location 510. In some examples, the event log data may be stored in the second memory location 510 in log units (e.g., having a given size), in a similar manner as described elsewhere herein. When a given event log is added to the second memory location 510, if a size of the event log fills a partial log unit, then padding (e.g., zero padding) may be used to fill a remainder of the log unit. In this way, coherent log units may be maintained for writing, reading, and/or wrapping log data stored in the second memory location 510.

As shown by reference number 530, the controller 130 (e.g., the event log management component 260) may be configured to cause first log data (e.g., associated with the first type of event log) to be stored in the first memory location 505. For example, as new data (e.g., that is associated with the first type of event log) is obtained by the controller 130 via a log data stream, the controller 130 may write the new data to the circular buffer associated with the first memory location 505. If the circular buffer is full prior to the data being written to the circular buffer, then the controller 130 may be configured to erase and/or overwrite the oldest data that is stored in the circular buffer. The controller 130 may be configured to replace (e.g., overwrite) the oldest data with the new data obtained from the log data stream. As a result, the circular buffer may be configured to store event log data over time effectively within a sliding or moving time window. In other words, the circular buffer may be configured to store the most recent log data (e.g., associated with the first type of event log) in time having a size that fits within (e.g., is less than or equal to) the fixed size of the circular buffer.

The memory device 120 and/or the controller 130 may continue to store data from the log data stream (e.g., into the first memory location 505 or the second memory location 510) as new data arrives at the controller 130 via the log data stream. For example, the controller 130 may be configured to continue to write event log data to the first memory location 505 or the second memory location 510 (e.g., based on a type or category associated with the event log data) in a similar manner as described above.

As shown by reference number 535, the memory device 120 and/or the controller 130 may detect a trigger event. The trigger event may be associated with flushing or writing data from the circular buffer (e.g., from the first memory location 505) to a non-volatile memory (e.g., the non-volatile memory array(s) 210 or NAND memory) of the memory device 120. In some implementations, the trigger event may be associated with an event included in the second log data (e.g., an event associated with the second type of event log). For example, the detecting the trigger event may include detecting that an event (e.g., from the log data stream) having an attribute has occurred.

In some implementations, the attribute may be associated with a severity level or a criticality of the event. For example, the controller 130 may assign a severity level to various events based on information associated with each event. For example, a packet or message associated with an event may include a field or indicator (e.g., a flag) indicating a severity level associated with the event. For example, the controller 130 may assign a first severity level for events associated with timestamp changes, health snapshots, and/or memory device status, among other examples. The controller 130 may assign a second severity level (e.g., indicating a higher severity than the first severity level) for events associated with power on events or power reset events, thermal issues, vendor-specific issues, firmware issues, read errors, write errors, and/or erase errors, among other examples. The controller 130 may assign a third severity level (e.g., indicating a higher severity than the first severity level and the second severity level) for events associated with hardware errors, a temperature of the memory device 120 exceeding a temperature threshold, memory encountering an uncorrectable error, parity memory errors, and/or unsupported memory configurations, among other examples.

In other words, the attribute may be associated with a severity level or a criticality of an event that has occurred associated with the memory device 120. As described in more detail elsewhere herein, based on detecting that a severe or critical event has occurred, the memory device 120 (e.g., the controller 130) may be configured to cause data that is currently stored in the first memory location 505 (e.g., in the circular buffer) to be flushed to a non-volatile memory location on the memory device 120 (e.g., to provide additional information or context of operations associated with the memory device at a time near when the severe or critical event occurred). In some examples, the controller 130 may detect the trigger event based on an event occurring that is associated with a severity level that satisfies a threshold. For example, the controller 130 may detect that an event has occurred that is associated with the third severity level described above. As another example, the controller 130 may detect the trigger event based on detecting an event associated with a certain type of event. For example, the controller 130 may maintain a table of events that may be associated with a trigger event. The controller 130 may compare a code or identifier (e.g., one or more bits in a packet or event log message) associated with an event to the table to determine if the event is associated with a trigger event.

As shown by reference number 540, the controller 130 may be configured to cause write operations to the first memory location 505 to stop. For example, based on detecting the trigger event, the controller 130 may be configured to stop writing to the first memory location 505. This may ensure a coherency of data that is read from the first memory location 505 (e.g., from the circular buffer) and that is stored in connection with the trigger event. In other words, stopping the write operations to the circular buffer may ensure that additional data is not written to the first memory location 505 (e.g., that may not be relevant to the trigger event) before the first memory location 505 is flushed. Additionally, stopping the write operations to the circular buffer may ensure that data that may be relevant to the trigger event is not overwritten by event log data associated with events that occurred after the trigger event is detected (e.g., and that may not be relevant to the trigger event).

In some examples, the controller 130 may provide an event log message to a module or component of the memory device 120 (e.g., to the event log management component 260) including an indicator or a flag that a trigger event has been detected. For example, the controller 130 may provide an event log message associated with an event (e.g., a critical or severe event, as described elsewhere herein). The event log message may include an indication that the event is severe (e.g., a severity level indicator or flag). Additionally, or alternatively, the event log message may include an indication that the first memory location 505 is to be read out to another memory location (e.g., is to be flushed). Based on providing or generating the event log message, the controller 130 (e.g., a component of the controller 130) may be configured to stop write operations associated with the first memory location 505. For example, the controller 130 (e.g., a component of the controller 130) may be configured to change a mode of the first memory location 505 from a write mode to a read mode.

In some examples, while the first memory location 505 is in the read mode, the controller 130 may be configured to store event log data that arrives via the log data stream, and that would otherwise have been written to the circular buffer, in a temporary storage location (e.g., that may be different than the temporary storage location 515). In other examples, while the first memory location 505 is in the read mode, the controller 130 may be configured to not store event log data that arrives via the log data stream and that would otherwise have been written to the circular buffer.

As shown by reference number 545, based on detecting the trigger event (e.g., and based on stopping the write operation to the first memory location 505), the controller 130 may be configured to read first log data (e.g., that is stored in the circular buffer) and write the first log data to the temporary storage location 515. In other words, based on detecting the trigger event, the controller 130 may be configured to cause data stored in first memory location 505 to be flushed to a different memory location. In some implementations, the different memory location may be the temporary storage location 515. In some other implementations, the different memory location may be a non-volatile memory array 210. Flushing the data stored in the first memory location 505 may include reading the data stored by the circular buffer and writing the data to the different memory location. In some implementations, flushing the data stored in the first memory location 505 may include erasing the data stored in the first memory location 505 (e.g., based on writing the data stored in the circular buffer to another storage location, such as the temporary storage location 515 or the non-volatile memory array 210).

As shown by reference number 550, based on flushing the first memory location 505 to the different storage location, the controller 130 may be configured to cause the write operation to the first memory location 505 to resume. In other words, based on writing the data that was stored in the circular buffer to the different storage location, the controller 130 may be configured to resume writing or storing log data in the first memory location 505 in a similar manner as described elsewhere herein. For example, the controller 130 may be configured to store additional data from the first data stream in the circular buffer after writing data stored in the circular buffer to another storage location and/or based on erasing the data stored in the circular buffer. In some implementations, flushing the circular buffer to the temporary storage location 515 may reduce a delay or an amount of time associated with resuming the write operation for the circular buffer. For example, programming data to the non-volatile memory array(s) 210 (e.g., NAND memory) may be associated with a longer programming time than programming data to the temporary storage location 515 (e.g., SRAM or DRAM memory). Therefore, by flushing the circular buffer to the temporary storage location 515, the controller 130 may be configured to resume writing data to the first memory location 505 with less delay as compared to if the circular buffer were flushed directly to the non-volatile memory array(s) 210 (e.g., NAND memory). Because trigger events may occur relatively close together in time, reducing an amount of time that the write operation to the first memory location 505 is stopped may be beneficial.

As shown by reference number 555, the controller 130 may be configured to transfer or write data associated with the trigger event from the second memory location 510 to the non-volatile memory array(s) 210 (e.g., NAND memory). In some implementations, the controller 130 may be configured to flush data stored in the second memory location 510 to a temporary storage location (e.g., that may be similar to the temporary storage location 515). The controller 130 may be configured to write the data associated with the trigger event in the non-volatile memory array(s) 210 (e.g., NAND memory).

Additionally, as shown by reference number 560, the controller 130 may be configured to write the data stored in the temporary storage location 515 to the non-volatile memory array(s) 210 (e.g., a NAND memory location). In some implementations, the data associated with the trigger event and the data stored in the temporary storage location 515 (e.g., the data from the circular buffer that was stored in the circular buffer at a time when the trigger event occurred) may be associated with (e.g., mapped to) one another in the non-volatile memory array(s) 210 (e.g., NAND memory). For example, in a first one or more blocks or memory units, the data associated with the trigger event may be stored in the non-volatile memory array(s) 210. In a second one or more blocks or memory units, the data from the circular buffer that was stored in the circular buffer at a time when the trigger event occurred may be stored. In this way, data associated with critical or severe events may be stored in connection with control flow and/or contextual information of operations of the memory device 120 (e.g., control flow information associated with log events and/or contextual information of operations that occurred leading up to the critical or severe event in time). This may provide beneficial information for debugging and/or design operations associated with the memory device 120 (e.g., while also complying with memory resource constraints by using the circular buffer, as described in more detail elsewhere herein).

As indicated above, FIG. 5 is provided as an example. Other examples may differ from what is described with regard to FIG. 5.

FIG. 6 is a diagram illustrating an example 600 of a process associated with memory device log data storage. The operations or functions described in connection with FIG. 6 and/or shown by the blocks depicted in FIG. 6 may be performed by the memory device 120, the controller 130, and/or the event log management component 260, among other examples.

As shown by reference number 605, the memory device 120 and/or the controller 130 may obtain one or more log data streams. For example, event log data may be generated by one or more components or modules of the memory device 120 and may be passed to the controller 130 and/or the event log management component 260, as described in more detail elsewhere herein.

As shown by reference number 610, the memory device 120 and/or the controller 130 may write persistent log data (e.g., from the one or more log data streams) to a first memory location (e.g., the second memory location 510). The memory device 120 and/or the controller 130 may write non-persistent log data to a circular buffer. The persistent log data may be included in the second type of log data described in connection with FIG. 5. The non-persistent log data may be included in the first type of log data described in connection with FIG. 5. For example, the persistent log data may be associated with events that occur on the memory device 120 infrequently (or less frequently than events associated with persistent log data), such as events associated with errors or exceptions of operations executed by the memory device 120. The non-persistent log data may be associated with events that occur frequently on the memory device 120, such as a flow or steps performed as part of operations executed by the memory device 120.

For example, the memory device 120 and/or the controller 130 may be configured to categorize events indicated by the one or more log data streams as a first type of event (e.g., non-persistent) or a second type of event (e.g., persistent). Based on categorizing the events, the memory device 120 and/or the controller 130 may be configured to store or write event log data associated with the first type of event and the second type of event to respective (e.g., different) memory locations. For example, data associated with the second type of event may be written to a memory location (e.g., the second memory location 510) and data associated with the first type of event may be written to a circular buffer, as described in more detail elsewhere herein.

As shown by reference number 615, the memory device 120 and/or the controller 130 may be configured to detect a severe event in the persistent log data. For example, detecting the severe event may include detecting an error event and/or an exception event. For example, the memory device 120 and/or the controller 130 may be configured to determine whether a severity level associated with an event (e.g., that arrives via the one or more log data steams) satisfies a threshold. As another example, the memory device 120 and/or the controller 130 may be configured to determine whether an event or an event message includes a flag or other indicator that indicates that the event is a severe or critical event.

If the memory device 120 and/or the controller 130 does not detect a severe event (e.g., No), then the memory device 120 and/or the controller 130 may be configured to continue to write persistent log data (e.g., from the one or more log data streams) to a first memory location (e.g., the second memory location 510) and to write non-persistent log data to the circular buffer, as described elsewhere herein. For example, if the circular buffer is full, then the memory device 120 and/or the controller 130 may be configured to overwrite (e.g., erase and/or remove) the oldest data stored in the circular buffer with new persistent log data. The memory device 120 and/or the controller 130 may be configured to continue to store or write event log data in this manner (e.g., if no severe events are detected).

If the memory device 120 and/or the controller 130 detect a severe event (e.g., Yes), then the memory device 120 and/or the controller 130 may be configured to flush the circular buffer to non-volatile memory (e.g., NAND memory) of the memory device 120. For example, as shown by reference number 620, based on detecting the severe event, the memory device 120 and/or the controller 130 may be configured to stop a write operation for the circular buffer. In other words, based on detecting the severe event, the memory device 120 and/or the controller 130 may be configured to refrain from writing additional or new event log data to the circular buffer. For example, the memory device 120 and/or the controller 130 may be configured to switch an operational mode of the circular buffer from a write mode to a read mode. As described elsewhere herein, this may ensure that a coherency of data read from the circular buffer for the severe event is maintained.

As shown by reference number 625, the memory device 120 and/or the controller 130 may be configured to read data stored in the circular buffer to a temporary memory location (e.g., the temporary storage location 515). For example, the memory device 120 and/or the controller 130 may be configured to read data stored in the circular buffer (e.g., data stored in the circular buffer at a time when the severe event is detected) and write the data to a temporary memory location (e.g., the temporary storage location 515). The temporary memory location may be volatile memory, such as SRAM or DRAM.

As shown by reference number 630, the memory device 120 and/or the controller 130 may be configured to resume the write operation for the circular buffer (e.g., based on transferring the data stored in the circular buffer to the temporary memory location). For example, the memory device 120 and/or the controller 130 may be configured to cause the operational mode of the circular buffer to be changed from the read mode to the write mode based on transferring the data stored in the circular buffer to the temporary memory location. Resuming the write operation after transferring the data stored in the circular buffer to the temporary memory location may reduce an amount of time that the write operation for the circular buffer is suspended. For example, a programming time for writing data to the temporary memory location may be less than a programming time for writing data to non-volatile memory of the memory device 120. Therefore, by staging the data stored in the circular buffer in the temporary memory location prior to writing the data to the non-volatile memory, an amount of time that the write operation for the circular buffer is stopped or suspended may be reduced.

As shown by reference number 635, the memory device 120 and/or the controller 130 may be configured to write the data associated with the circular buffer (e.g., the data that was stored in the circular buffer at a time when the severe event was detected) and information associated with the severe event to non-volatile memory (e.g., NAND memory or another non-volatile memory) of the memory device 120. For example, the data associated with the circular buffer and data associated with the severe event may be stored together (e.g., mapped together or associated with one another) in the non-volatile memory. For example, the data associated with the circular buffer and data associated with the severe event may be associated with time stamps (e.g., the event log management component 260 may attach a time stamp to any event that is generated). Therefore, events may be correlated via respective timestamps. In other words, when event log data associated with a severe event is stored by the memory device 120, non-persistent event log data (e.g., the data that was stored in the circular buffer at a time when the severe event was detected) may be stored in connection with the event log data associated with the severe event (e.g., in the non-volatile memory of the memory device 120).

As a result, event log information associated with normal or typical memory device operation, such as the data stored in the circular buffer (e.g., control flow information, device status information, or other information), may be stored in connection with event log information associated with severe or critical events (e.g., error events or exception events) in non-volatile memory of the memory device 120. For example, because the buffer (e.g., the circular buffer) stores the most recent event log information associated with normal or typical memory device operation, causing the buffer to be flushed to the non-volatile memory when a trigger event is detected may provide a "snapshot" of more detailed event log information associated with the memory device around the time when the trigger event (e.g., the severe event) occurred. Additionally, because the buffer may have a fixed size, this may enable the memory device 120 to conserve a size associated with storing the non-persistent event log information (e.g., as compared to storing all non-persistent event log information that is generated by the memory device) while also enabling more detailed event log information to be stored when severe or critical events occur. This may be beneficial for debugging or design operations that would not otherwise have the more detailed event log information (e.g., the non-persistent event log information) that is associated with a trigger event available.

As indicated above, FIG. 6 is provided as an example. Other examples may differ from what is described with regard to FIG. 6.

FIG. 7 is a flowchart of an example method 700 associated with memory device log data storage. In some implementations, a memory device (e.g., memory device 120) may perform or may be configured to perform one or more process blocks of FIG. 7. In some implementations, another device or a group of devices separate from or including the memory device (e.g., the host device 110) may perform or may be configured to perform one or more process blocks of FIG. 7. Additionally, or alternatively, one or more components of the memory device (e.g., the memory management component 250, the event log management component 260, and/or the memory 140) may perform or may be configured to perform one or more process blocks of FIG. 7.

As shown in FIG. 7, the method 700 may include storing a first data stream associated with a first type of log data in a circular buffer (block 710). As further shown in FIG. 7, the method 700 may include storing a second data stream associated with a second type of log data in another memory location (block 720). As further shown in FIG. 7, the method 700 may include detecting an event included in the second data stream that is associated with an attribute level that satisfies a threshold (block 730). As further shown in FIG. 7, the method 700 may include writing data stored in the circular buffer after a time at which the event is detected to a non-volatile memory based on the attribute level satisfying the threshold, wherein the data stored in the circular buffer is stored in the non-volatile memory in connection with data associated with the event (block 740).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 5-6.

FIG. 8 is a flowchart of an example method 800 associated with memory device log data storage. In some implementations, a memory device (e.g., memory device 120) may perform or may be configured to perform one or more process blocks of FIG. 8. In some implementations, another device or a group of devices separate from or including the memory device (e.g., the host device 110) may perform or may be configured to perform one or more process blocks of FIG. 8. Additionally, or alternatively, one or more components of the memory device (e.g., the memory management component 250, the event log management component 260, and/or the memory 140) may perform or may be configured to perform one or more process blocks of FIG. 8.

As shown in FIG. 8, the method 800 may include writing first event log data to a first memory location, wherein the first memory location is associated with a buffer having a fixed size, and wherein the first event log data is non-persistent event log data (block 810). As further shown in FIG. 8, the method 800 may include writing second event log data to a second memory location, wherein the second event log data is persistent event log data, wherein the second event log data is associated with an event (block 820). As further shown in FIG. 8, the method 800 may include writing, to a flash memory location, first information stored in the buffer and second information associated with the event based on an attribute associated with the event, wherein the first information stored in the buffer is stored in the flash memory location in connection with the second information (block 830).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 5-6.

FIG. 9 is a flowchart of an example method 900 associated with memory device log data storage. In some implementations, a memory device (e.g., memory device 120) may perform or may be configured to perform one or more process blocks of FIG. 9. In some implementations, another device or a group of devices separate from or including the memory device (e.g., the host device 110) may perform or may be configured to perform one or more process blocks of FIG. 9. Additionally, or alternatively, one or more components of the memory device (e.g., the memory management component 250, the event log management component 260, and/or the memory 140) may perform or may be configured to perform one or more process blocks of FIG. 9.

As shown in FIG. 9, the method 900 may include writing first log data to a buffer, wherein the first log data is associated with a first type of log event (block 910). As further shown in FIG. 9, the method 900 may include writing second log data to a first memory location, wherein the second log data is associated with a second type of log event (block 920). As further shown in FIG. 9, the method 900 may include detecting a trigger event included in the second log data (block 930). As further shown in FIG. 9, the method 900 may include stopping a write operation associated with writing the first log data to the buffer based on detecting the trigger event (block 940). As further shown in FIG. 9, the method 900 may include writing data stored in the buffer to a second memory location based on detecting the trigger event (block 950). As further shown in FIG. 9, the method 900 may include resuming the write operation associated with writing the first log data to the buffer based on reading the data stored in the buffer to the second memory location (block 960).

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein, such as the operations described in connection with FIGS. 5-6.

In some implementations, a memory device includes one or more components configured to: write first event log data to a first memory location, wherein the first memory location is associated with a buffer having a fixed size, and wherein the first event log data is non-persistent event log data; write second event log data to a second memory location, wherein the second event log data is persistent event log data, wherein the second event log data is associated with an event; and write, to a flash memory location, first information stored in the buffer and second information associated with the event based on an attribute associated with the event, wherein the first information stored in the buffer is stored in the flash memory location in connection with the second information.

In some implementations, a method includes storing, by a memory device, a first data stream associated with a first type of log data in a circular buffer; storing, by the memory device, a second data stream associated with a second type of log data in another memory location; detecting, by the memory device, an event included in the second data stream that is associated with an attribute level that satisfies a threshold; and writing, by the memory device, data stored in the circular buffer after a time at which the event is detected to a non-volatile memory based on the attribute level satisfying the threshold, wherein the data stored in the circular buffer is stored in the non-volatile memory in connection with data associated with the event.

In some implementations, a system includes means for writing first log data to a buffer, wherein the first log data is associated with a first type of log event; means for writing second log data to a first memory location, wherein the second log data is associated with a second type of log event; means for detecting a trigger event included in the second log data; means for stopping a write operation associated with writing the first log data to the buffer based on detecting the trigger event; means for writing data stored in the buffer to a second memory location based on detecting the trigger event; and means for resuming the write operation associated with writing the first log data to the buffer based on reading the data stored in the buffer to the second memory location.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
      write first event log data to a first memory location, wherein the first memory location is associated with a volatile memory;
      write second event log data to a second memory location, wherein the second event log data is associated with an event; and
      write, to a non-volatile memory, first information stored in the volatile memory and second information associated with the event based on an attribute level associated with the event satisfying a threshold.

2. The memory device of claim 1, wherein the first information stored in the volatile memory is stored in the non-volatile memory in connection with the second information.

3. The memory device of claim 1, wherein the volatile memory includes a buffer having a fixed size.

4. The memory device of claim 3, wherein the buffer is a circular buffer.

5. The memory device of claim 1, wherein the non-volatile memory includes a flash memory location.

6. The memory device of claim 1, wherein the second memory location comprises a different type of memory than the first memory location.

7. The memory device of claim 1, wherein:
   the first event log data is non-persistent event log data, and
   the second event log data is persistent event log data.

8. The memory device of claim 1, wherein the first memory location includes a static random-access memory (SRAM).

9. The memory device of claim 1, wherein the attribute level includes a severity level associated with the event.

10. The memory device of claim 1,
wherein the one or more components, to write the first
information stored in the volatile memory and the
second information, are configured to:
    cause write operations of the first event log data to the
first memory location to stop based on the event
occurring;
    write the first information stored in the volatile memory
to the non-volatile memory; and
    resume the write operations of the first event log data
to the first memory location based on writing the
information stored in the volatile memory to the
non-volatile memory.

11. The memory device of claim 10,
wherein the one or more components, to write the first
information stored in the volatile memory to the non-
volatile memory, are configured to:
    write the first information stored in the volatile memory
to a temporary storage location; and
    write the first information from the temporary storage
location to the non-volatile memory.

12. The memory device of claim 11,
wherein resuming the write operations of the first event
log data to the first memory location is based on writing
the first information stored in the volatile memory to
the temporary storage location.

13. A method, comprising:
storing, by a memory device, a first data stream associated
with a first type of log data in a volatile memory;
storing, by the memory device, a second data stream
associated with a second type of log data in another
memory location;
detecting, by the memory device, an event included in the
second data stream that is associated with an attribute
level that satisfies a threshold; and
writing, by the memory device, data stored in the volatile
memory after a time at which the event is detected to
a non-volatile memory based on the attribute level
satisfying the threshold.

14. The method of claim 13,
wherein the data stored in the volatile memory is stored in
the non-volatile memory in connection with data asso-
ciated with the event.

15. The method of claim 13,
wherein the volatile memory includes a circular buffer,
and wherein the non-volatile memory includes a flash
memory location.

16. The method of claim 13, further comprising:
refraining from storing information from the first data
stream in the volatile memory based on detecting the
event; and resuming storing the information from the first data
stream in the volatile memory based on transferring the
data stored in the volatile memory to the non-volatile
memory.

17. The method of claim 13,
wherein writing the data stored in the volatile memory
after the time at which the event is detected to the
non-volatile memory comprises:
    reading the data stored in the volatile memory at the
time at which the event is detected;
    writing the data stored in the volatile memory to a
transitional memory location; and
    writing the data stored in the transitional memory
location to the non-volatile memory.

18. The method of claim 13,
wherein writing the data stored in the volatile memory at
the time at which the event is detected to the non-
volatile memory comprises:
    erasing the data stored in the volatile memory based on
writing the data stored in the volatile memory to the
non-volatile memory; and
    storing additional data from the first data stream in the
volatile memory after erasing the data.

19. The method of claim 13,
wherein the attribute level includes a severity level asso-
ciated with the event.

20. A system, comprising:
means for writing first log data to a volatile memory,
    wherein the first log data is associated with a first type
of log event;
means for writing second log data to a first memory
location,
    wherein the second log data is associated with a second
type of log event;
means for detecting a trigger event included in the second
log data,
    wherein detecting the trigger event is based on an
attribute level associated with the trigger event sat-
isfying a threshold;
means for stopping a write operation associated with
writing the first log data to the volatile memory based
on detecting the trigger event;
means for writing data stored in the volatile memory to a
second memory location based on detecting the trigger
event; and
means for resuming the write operation associated with
writing the first log data to the volatile memory based
on reading the data stored in the volatile memory to the
second memory location.

\* \* \* \* \*